Feb. 13, 1962 A. BRANITZKY 3,020,948
ANTISKID DEVICES FOR VEHICLE WHEELS
Filed Aug. 29, 1960
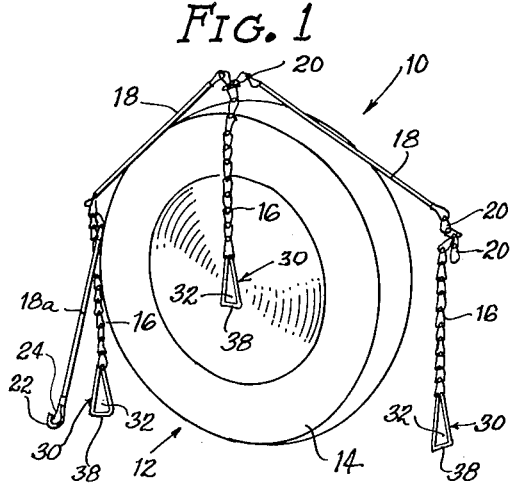
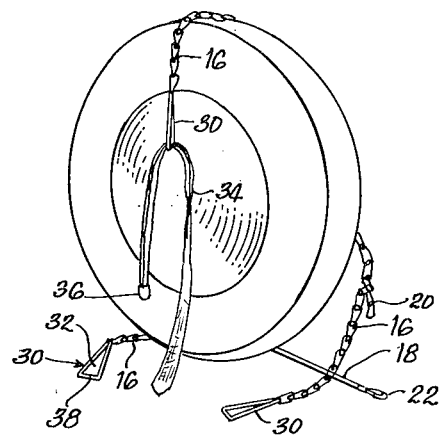
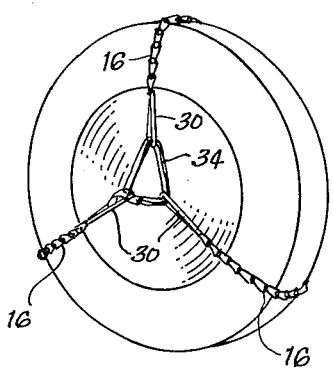
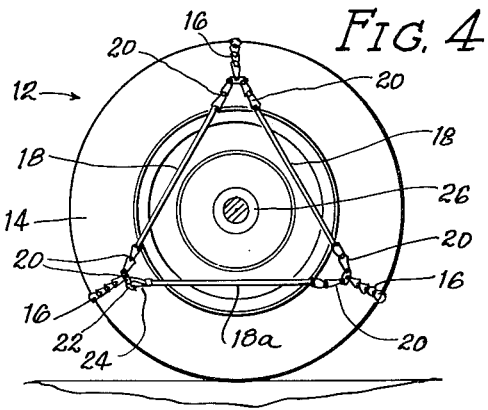
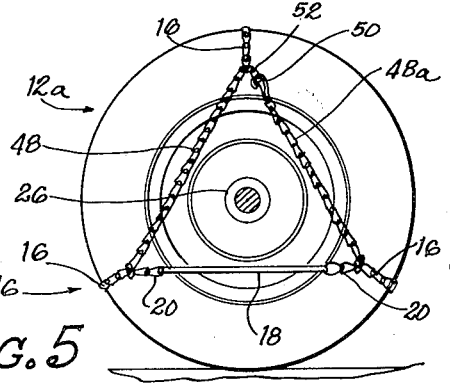
INVENTOR.
Abraham Branitzky
BY
Ooms, McDougall, Williams & Hersh
Attorneys

United States Patent Office 3,020,948
Patented Feb. 13, 1962

3,020,948
ANTISKID DEVICES FOR VEHICLE WHEELS
Abraham Branitzky, 500 E. 33rd St., Chicago 16, Ill.
Filed Aug. 29, 1960, Ser. No. 52,508
5 Claims. (Cl. 152—233)

This invention relates to antiskid or traction devices for the wheels of automotive vehicles, such as automobiles, trucks or the like. Such devices are commonly known as tire chains, because they generally utilize chains or cleats which extend across the tread of the tire.

One object of the present invention is to provide a new and improved antiskid device which may be installed very easily on the tire of a vehicle, even after the vehicle is already stuck in snow, sand, mud or the like.

A further object is to provide a new and improved antiskid device which may be installed very readily without jacking up the vehicle and without any tools.

Another object is to provide a new and improved antiskid device which may be installed so easily that it is hardly necessary to soil the hands in the process.

It is another object to provide a new and improved antiskid device which employs a minimum of material and is extremely light in weight.

A further object is to provide a new and improved antiskid device which provides highly effective traction and is retained very securely on the vehicle wheel, yet is easy to manufacture and extremely low in cost.

Further objects and advantages of the present invention will appear from the following description, taken with the accompanying drawings, in which:

FIG. 1 is a perspective view showing an antiskid device to be described as an illustrative embodiment of the present invention, the view showing the antiskid device in the first stage of its installation on a vehicle wheel.

FIG. 2 is a perspective view similar to FIG. 1 but showing a more advanced stage in the installation of the antiskid device.

FIG. 3 is a perspective view showing the outside of the vehicle wheel with the antiskid device fully installed.

FIG. 4 is an elevational view showing the inner or rear side of the vehicle wheel with the antiskid device fully installed.

FIG. 5 is a view similar to FIG. 4, but showing a modified construction.

As already indicated, FIGS. 1–4 illustrate an antiskid or traction device 10 adapted to be applied to a vehicle wheel 12 of the usual type having a pneumatic tire 14 mounted thereon. As shown to best advantage in FIGS. 3 and 4, the antiskid device 10 comprises at least three chains or other traction members 16 extending across the tread of the tire 14 at equal angular intervals. More than three chains may be employed, although there is a definite advantage in utilizing three chains.

The inner ends of the chains 16 are interconnected by means of a plurality of tension members, preferably taking the form of elongated rods 18. The rods or other tension members correspond in numbers ot the chains 16 and are arranged to form a closed polygon. As already indicated, it is advantageous to employ three of the chains 16 and three of the rods 18 in which case the rods are arranged to form a triangle, as clearly illustrated in FIG. 4. The ends of the rods 18 may be connected to the inner ends of the chains 16 by means of short links of chain 20. In this way, the rods 18 will be freely swingable with respect to the ends of the chains 16 and with respect to each other. Moreover, the ends of the rods 18 will be spaced slightly from the inner side wall of the tire 14. One end of one of the rods 18 is provided with a hook 22 which may readily be detached from and attached to the corresponding chain 20. The hook 22 is preferably of the type having a spring 24 for retaining the hook on the chain 20 after the hook has been snapped into position on the chain. The hook 22 makes it easy to mount the rods 18 around the axle 26 of the vehicle wheel. Thus, the provision of the hook facilitates the installation of the antiskid device on the vehicle wheel. The rod which carries the hook 22 will be designated 18a. Normally, the antiskid device is installed on the vehicle wheel 12 in such a position that the rod 18a is substantially horizontal and is the lowermost of the three rods. The ends of the rods 18, other than the end equipped with the hook 22, may be welded to the end links of chains 20.

The front ends of the traction chains 16 are preferably provided with loops 30 or other elements having openings 32 therein. As shown, it is preferred to employ loops which are triangular in shape. The loops 30 are disengageably interconnected by means of an additional tension member, which preferably takes the form of a belt or strap 34. The strap 34 may be made of webbing or other suitable material and may be provided with a buckle or other fastener 36 so that the strap may readily be attached and detached. It will be seen that the strap 34 is strung through the loops 30 to form a closed polygon. When three traction chains 16 are employed, as in the case of the illustrated embodiment, the polygon takes the form of a triangle.

The loops 30 are preferably made big enough so that the buckle 36 will readily pass through the loops. Thus, the strap 34 may be threaded through the loops from either end of the strap. By virtue of the triangular shape of each loop 30, the strap engages a straight bar portion 38 of the loop 30, so that stresses on the strap will be minimized.

FIGS. 1, 2 and 3 illustrate an advantageous method of installing the antiskid device 10 on the vehicle wheel 12. It will be seen that the two uppermost rods 18 are passed over the top of the vehicle wheel, with the uppermost traction chain 16 hanging downwardly on the outer side of the vehicle wheel. The lowermost rod 18a is then swung behind the vehicle wheel and is snapped onto its corresponding chain link or ring 20. This may readily be done even when the vehicle wheel is stuck in snow, sand or mud. The strap 34 is then threaded through the loops 30 and is buckled and pulled up tight, as shown in FIG. 3. This completes the installation of the antiskid device. The strap 34 retains the antiskid device on the vehicle wheel in an extremely secure manner. It will be noted that the strap 34 is loaded in pure tension. Thus, its tensile strength is efficienctly utilized.

The loading on the rods 18 is also purely in tension. Thus, the strength of the rods is also efficiently utilized. Accordingly, the rods may be made light in weight, while still providing the necessary strength. The provision of the rods greatly reduces the cost of the antiskid device, because of the low cost of the material employed in the rods. Of course, the rods and the chains are normally made of suitable steels, although other metals could be employed.

It is an easy matter to pass the uppermost rods 18 over the top of the vehicle wheel. Moreover, it is equally easy to swing the lowermost rod behind the vehicle wheel. It is quite possible to install the antiskid device on the vehicle wheel without even soiling the hands.

FIG. 5 illustrates a modified antiskid device 46 which is the same as the antiskid device 16, except that two of the rods 18 are replaced with chains 48. One of the chains, designated 48a, is formed with a snap hook 50 on one end thereof so that the chain 48a may readily be attached and detached from the corresponding traction chain 16. The modified antiskid device 46 may be installed on the vehicle wheel 12 by swinging the rod 18 and the chain 48a around the back of the vehicle wheel and then bringing the chains 48 and 48a upwardly around the axle 26. The hook 50 is then snapped onto the connecting chain link 52 so as to complete the triangle formed by the rod 18 and the chains 48 and 48a. As before, the traction chains 16 are then brought across the tread of the tire 14 to the outer side of the wheel. The strap 34 is strung through the eyes or loops 30 and is buckled and tightened to hold the antiskid device on the vehicle wheel.

The provision of the rigid rods, rather than the chains, to interconnect the inner ends of the traction chains, generally makes it easier to install the antiskid device on the vehicle wheel. Moreover, the cost of the rods is lower than the cost of the interconnecting chains.

It will be evident that the antiskid devices of the present invention will fit on vehicle wheels of a wide variety of sizes. For larger wheels, the strap 34 forms a larger triangle when the strap is buckled and tightened. Thus, the strap provides a considerable range of adjustment whereby wheels of various sizes may be accommodated.

Various other modifications, alternative constructions and equivalents may be employed without departing from the true spirit and scope of the invention as exemplified in the foregoing description and defined in the following claims.

I claim:

1. In an antiskid device for a vehicle wheel, the combination comprising at least three chains adapted to extend across the tread of the wheel between its inner and outer sides, said chains being spaced at equal angular intervals, at least three rods corresponding in number to said chains and connected between the inner ends of said chains to form a closed polygon, chain lengths connecting the ends of said rods to the inner ends of said chains, one end of one of said rods having a hook thereon for detaching said end of said one rod to open said polygon for easy installation of the antiskid device on the vehicle wheel, said rods acting as members in pure tension for interconnecting the inner ends of said chains, triangular loops connected to the outer ends of said chains, and a belt disengageably strung through said loops and forming a pure tension member interconnecting the outer ends of said chains for tightening said chains on the vehicle wheel.

2. In an antiskid device for a vehicle wheel, the combination comprising three antiskid chains adapted to extend across the tread of a vehicle wheel between the inner and outer sides thereof at equally spaced intervals, three rods for interconnecting the inner ends of said antiskid chains to form a closed triangle, chain links for connecting the ends of said rods to the inner ends of said chains, one of said rods having a hook at one end thereof for detaching said one end of said one rod and thereby opening said triangle to facilitate installation of said antiskid device on the vehicle wheel, three triangular loops connected to the outer ends of said respective antiskid chains, and a belt strung through said triangular loops and interconnecting the outer ends of said antiskid chains, said belt having a buckle therein for easy installation of said belt, said rods and said belt being loaded in pure tension.

3. In an antiskid device for a vehicle wheel, the combination comprising three antiskid chains adapted to extend across the tread of a vehicle wheel between the inner and outer sides thereof at equally spaced intervals, three rods interconnecting the inner ends of said antiskid chains to form a closed triangle, one of said rods having a detachable hook at one end thereof for opening said triangle to facilitate installation of said antiskid device on the vehicle wheel, elements having openings therein and connected to the outer end of said respective antiskid chains, and a strap strung through said elements and interconnecting the outer ends of said antiskid chains, said strap having a buckle therein for easy installation of said strap, said rods and said strap being loaded in pure tension.

4. In an antiskid device for vehicle wheels, the combination comprising at least three antiskid chains adapted to extend across the tread of a vehicle wheel between the inner and outer sides thereof at equally spaced intervals, at least three tension members corresponding in number to said chains and interconnecting the inner ends of said chains to form a closed polygon, one of said tension members comprising means for opening said polygon to facilitate installation of the antiskid device on a vehicle wheel, at least one of said tension members taking the form of an elongated rod, elements having openings therein and connected to the outer ends of said chains, and a strap strung through said elements and interconnecting the outer ends of said chains, said strap having a disengageable closing device therein for facilitating installation of said strap.

5. In an antiskid device for a vehicle wheel, the combination comprising three chains adapted to extend across the tread of the wheel between its inner and outer sides at equal angular intervals, three rods corresponding in number to said chains and connected between the inner ends of said chains to form a closed triangle, one end of one of said rods having a hook thereon for detaching said end of said one rod to open said triangle for easy installation of the antiskid device on the vehicle wheel, said rods acting as members in pure tension for interconnecting the inner ends of said chains, elements with openings therein and connected to the outer ends of said chains, and a strap disengageably strung through said elements and forming a pure tension member interconnecting the outer ends of said chains for tightening said chains on the vehicle wheel.

References Cited in the file of this patent

UNITED STATES PATENTS

| | | |
|---|---|---|
| 1,336,369 | Muffly | Apr. 6, 1920 |
| 1,465,710 | Corrington | Apr. 21, 1923 |
| 2,176,631 | Kunkle | Oct. 17, 1939 |
| 2,826,232 | Korn | Mar. 11, 1958 |
| 2,918,960 | McGuinness | Dec. 29, 1959 |